No. 851,653. PATENTED APR. 30, 1907.
H. E. CRANDALL.
HOSE CLAMP.
APPLICATION FILED FEB. 23, 1906.

WITNESSES: Homer E. Crandall, INVENTOR
By C. A. Snow & Co.
ATTORNEYS

UNITED STATES PATENT OFFICE.

HOMER E. CRANDALL, OF SALAMANCA, NEW YORK.

HOSE-CLAMP.

No. 851,653.  Specification of Letters Patent.  Patented April 30, 1907.

Application filed February 23, 1906. Serial No. 302,565.

*To all whom it may concern:*

Be it known that I, HOMER E. CRANDALL, a citizen of the United States, residing at Salamanca, in the county of Cattaraugus and State of New York, have invented a new and useful Hose-Clamp, of which the following is a specification.

This invention relates to hose clamps, and has for its object to provide an improved clamp capable of being conveniently manipulated to snugly clamp hose pipes to metallic fittings.

It is furthermore designed to have the clamp automatically lock itself when it has been tightened upon a hose, and to effect convenient release of the clamp merely by swinging the clamping lever in a direction reverse to the tightening direction thereof.

With these and other objects in view, the present invention consists in the combination and arrangement of parts as will be hereinafter more fully described, shown in the accompanying drawing and particularly pointed out in the appended claims, it being understood that changes in the form, proportion, size and minor details may be made, within the scope of the claims without departing from the spirit or sacrificing any of the advantages of the invention.

Figure 1:
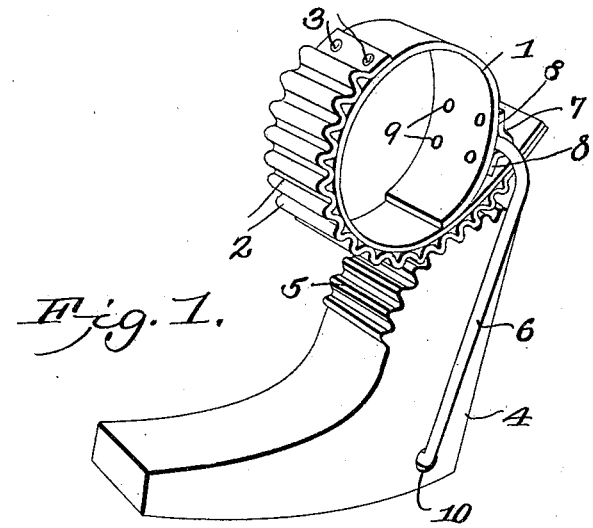
Figure 2:
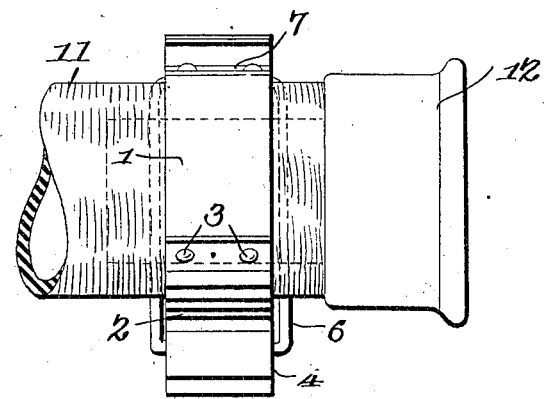
Figure 3:
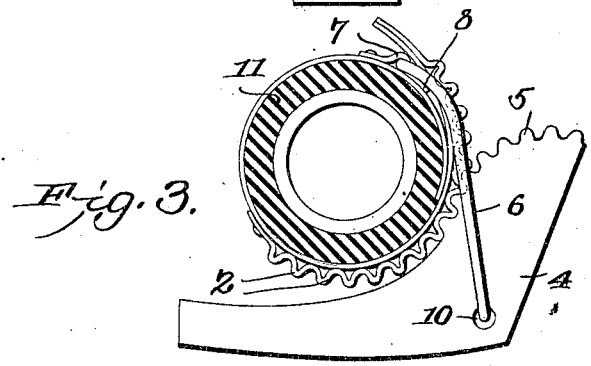

In the drawing: Figure 1 is a perspective view of a hose clamp embodying the features of the present invention. Fig. 2 is an elevation of the clamp applied to a hose. Fig. 3 is a cross sectional view through the hose and the fitting with the clamp in elevation.

Like characters of reference designate corresponding parts in all of the figures of the drawing.

The present clamp includes a resilient metallic band 1 of suitable width which is provided upon its exterior and upon one end portion thereof with a series of transversely disposed teeth 2. By preference, these teeth are formed by a corrugated strip of resilient metal secured at opposite ends to the band by suitable fastenings 3, preferably rivets. It will of course be understood that the ends of the band 1 are free and unrestricted and normally overlap one another with the toothed portion upon the outer side of the untoothed portion.

Associated with the band is an angular or cam lever 4 provided upon one side of one member with a series of transversely-disposed teeth 5 designed to engage with the teeth of the clamping band. A bail or link 6 is pivotally connected to the exterior of the untoothed end portion of the band in a bearing 7 which is preferably a metal plate bent to form a bearing-eye, and opposite flanges 8 which are connected to the band by rivets 9. The link or bail 6 straddles the toothed arm of the lever and is pivotally connected thereto by having an end portion received within an opening 10 extending through the lever.

In practice, to secure a hose 11 to a metallic fitting 12 which is received therein, the clamping band is embraced by the hose and then the toothed portion of the lever is engaged with the toothed portion of the clamping band, whereupon the lever is swung toward the clamping band and the free end of the latter is moved endwise across the untoothed end thereof so as to draw the band into snug engagement with the hose. When the lever has been swung in against the clamp so as to have its terminal lie against the same, as in Fig. 3, the clamp will be automatically locked by reason of the toggle connection afforded by the link or bail 6 between the inner end of the clamping band and the middle portion of the lever. To release the clamp, the handle end of the lever is merely swung outward, whereby its toothed portion rides over the toothed portion of the band until disengaged therefrom, whereupon the band will be loosened and may be removed from the hose.

Having thus described the invention, what is claimed is:

1. A hose clamp comprising a resilient band provided upon one end portion with teeth, a toothed cam associated with the toothed portion of the band, and a link connection between the cam and the other end of the band.

2. A hose clamp comprising a resilient band having one end portion externally toothed, a handled cam having teeth associated with the teeth of the band, and a link connection between the cam and the other end of the band, the handle of the cam constituting a stop for engagement with the band to limit the swinging movement of the cam.

3. A hose clamp comprising a resilient band which is externally toothed at one end, a toothed cam associated with the toothed portion of the band, and a bail-shaped link pivoted to the other end of the band and pivotally embracing the cam.

4. A hose clamp comprising a resilient band, a resilient corrugated strip secured to the exterior of the band at one end thereof and constituting teeth, a cam having integral teeth for engaging the teeth on the band, and a pivotal connection between the cam and the other end of the band.

5. A hose clamp comprising a resilient band, a corrugated resilient strip secured to the exterior of the other end of the band, a toothed cam associated with the teeth of the band, and a bail-shaped link straddling the cam with one end pivotally engaging the bearing and its other end pivotally engaging the cam.

In testimony that I claim the foregoing as my own, I have hereto affixed my signature in the presence of two witnesses.

HOMER E. CRANDALL.

Witnesses:
   ROBERT P. COLLINS,
   WILLIS G. HARKER.